US012445541B1

(12) United States Patent
Leib

(10) Patent No.: US 12,445,541 B1
(45) Date of Patent: Oct. 14, 2025

(54) NETWORK DEVICE WITH DATABASE FOR ACCELERATING PACKET PROCESSING

(71) Applicant: Marvell Israel (M.I.S.L) Ltd., Yokneam (IL)

(72) Inventor: Zvi Shmilovici Leib, Tel Aviv (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 370 days.

(21) Appl. No.: 18/136,300

(22) Filed: Apr. 18, 2023

Related U.S. Application Data

(60) Provisional application No. 63/331,991, filed on Apr. 18, 2022.

(51) Int. Cl.
*H04L 69/22* (2022.01)
*H04L 45/745* (2022.01)
*H04L 49/00* (2022.01)

(52) U.S. Cl.
CPC ............ *H04L 69/22* (2013.01); *H04L 45/745* (2013.01); *H04L 49/3063* (2013.01)

(58) Field of Classification Search
CPC ....... H04L 69/22; H04L 69/16; H04L 69/161; H04L 45/7453; H04L 49/30; H04L 67/1001; H04L 67/1008; H04L 67/1014; H04L 67/1017; H04L 67/1023; H04L 67/14; H04L 67/61; H04L 67/63; H04L 69/163; H04L 69/329; H04L 41/0266; H04L 45/74; H04L 45/74591; H04L 49/252; H04L 49/9057; H04L 63/0428; H04L 63/166; H04L 63/168; H04L 41/142; H04L 41/50; H04L 41/5009; H04L 43/026; H04L 43/06; H04L 43/0817; H04L 43/0847; H04L 43/0852; H04L 43/087; H04L 43/106; H04L 43/12; H04L 43/18; H04L 45/745; H04L 47/2441; H04L 49/101; H04L 49/20; H04L 49/205; H04L 49/25; H04L 49/3009; H04L 49/35; H04L 69/18
USPC ....... 370/392, 415, 254, 235, 293, 229, 360, 370/389, 477, 401, 230.1
See application file for complete search history.

(56) References Cited

U.S. PATENT DOCUMENTS

| | | | |
|---|---|---|---|
| 6,665,725 B1 * | 12/2003 | Dietz | ..................... H04L 69/16 709/228 |
| 7,539,750 B1 * | 5/2009 | Parker | ..................... G06F 15/16 709/224 |
| 8,625,594 B2 | 1/2014 | Safrai et al. | |
| 9,154,418 B1 | 10/2015 | Ben-mayor | |
| 11,362,948 B2 | 6/2022 | Shmilovici Leib | |

(Continued)

*Primary Examiner* — Joseph Arevalo

(57) ABSTRACT

A packet processor of a network device includes a first lookup engine that generates a first lookup key for a packet, performs a first lookup in a first database using the first lookup key, and in response to finding a match of the first lookup key in the first database, determines a plurality of processing actions to be performed for the packet. Each of multiple second lookup engines selectively performs a respective second lookup in a respective second database for the packet using a respective second lookup key, and ii) selectively determines, based on the second lookup, one or more processing actions to be performed for the packet. The second lookup engines skip performing the second lookups for the packet in response to the first lookup engine finding the match of the first lookup key in the first database.

20 Claims, 4 Drawing Sheets

(56) References Cited

U.S. PATENT DOCUMENTS

| | | | |
|---|---|---|---|
| 2004/0210663 A1* | 10/2004 | Phillips | H04L 69/163 |
| | | | 709/230 |
| 2004/0250059 A1* | 12/2004 | Ramelson | H04L 63/0428 |
| | | | 713/150 |
| 2019/0289102 A1* | 9/2019 | Goel | H04L 45/74591 |
| 2020/0314030 A1* | 10/2020 | Goel | H04L 45/74 |

* cited by examiner

NETWORK DEVICE WITH DATABASE FOR ACCELERATING PACKET PROCESSING

CROSS REFERENCES TO RELATED APPLICATIONS

This application claims the benefit of U.S. Provisional Patent App. No. 63/331,991, entitled "Packet Processing Accelerating Cache," filed on Apr. 18, 2022, the disclosure of which is expressly incorporated herein by reference in its entirety.

FIELD OF TECHNOLOGY

This disclosure relates generally to network communications, and more particularly to network devices such as routers, switches, etc.

BACKGROUND

During this time of growth of Internet technologies and usage, demand for high speed data transmission has increased rapidly. As an example, average internet traffic in 2021 was estimated to exceed 700 terabytes per second. Technologies to support such sustained usage levels will continue to proliferate. Optical transmission of data, for example, can support transmission of vast amounts of data per channel-often limited more by the rate at which electronics can encode a signal onto the optical channel rather than the bandwidth of the channel itself.

As transmission rates increase and networks grow, the processing rates of network devices, such as switches, routers, etc., are also increasing and the sizes of forwarding tables of such network devices are increasing. Additionally, other performance requirements are becoming more stringent, such as processing latency, and more processing features are being requested by customers.

SUMMARY

In an embodiment, a network device for processing packets comprises: a plurality of network interfaces; and a packet processor coupled to the plurality of network interfaces, the packet processor configured to process packet headers of packets received via the plurality of network interfaces to determine network interfaces via which the packets are to be transmitted. The packet processor comprises: a header parser engine configured to, for each of at least some of the packets, parse a header portion of the packet to identify header fields in the packet that are defined by one or more network communication protocols; a first lookup engine coupled to a first database, the first lookup engine configured to, for each of at least some of the packets: i) generate a first lookup key using a plurality of header fields identified by the header parser engine, ii) perform a first lookup in the first database for the packet using the first lookup key, and iii) in response to finding a match of the first lookup key in the first database, determine a plurality of processing actions to be performed by the packet processor in connection with the packet; a plurality of second lookup engines, each second lookup engine configured to, for each of at least some of the packets: i) selectively perform a respective second lookup in a respective second database for the packet using a respective second lookup key that includes a respective set of one or more header fields identified by the header parser engine, and ii) selectively determine, based on the second lookup, one or more processing actions to be performed by the packet processor in connection with the packet; and a controller configured to cause the plurality of second lookup engines to skip performing the second lookups for the packet in response to the first lookup engine finding the match of the first lookup key in the first database.

In another embodiment, a method for processing a packet in a network device includes: receiving a packet via a network interface among a plurality of network interfaces of the network device; parsing, at a packet processor of the network device, a header portion of the packet to identify header fields in the packet that are defined by one or more network communication protocols; generating, at the packet processor, a first lookup key for the packet using a plurality of header fields identified by the parsing of the header portion of the packet; performing, at the packet processor, a first lookup in a first database using the first lookup key; in response to determining there is a match of the first lookup key in the first database, determining, by the packet processor, a plurality of processing actions to be performed by the network device in connection with the packet based on information in the first database corresponding to the match of the first lookup key in the first database; in response to determining that there is no match of the first lookup key in the first database: performing, at the packet processor, a plurality of second lookups in a plurality of second databases using a plurality of second lookup keys, the plurality of second lookup keys having been generated using one or more header fields identified by the parsing of the header portion of the packet, and determining, at the packet processor, the plurality of processing actions to be performed by the network device in connection with the packet based on information in the second databases corresponding to matches of the second lookup keys in the second databases; in response to determining that there is the match of the first lookup key in the first database, skipping performing the plurality of second lookups for the packet; and performing, by the network device, the plurality of processing actions for the packet.

DETAILED DESCRIPTION

Figure 1:
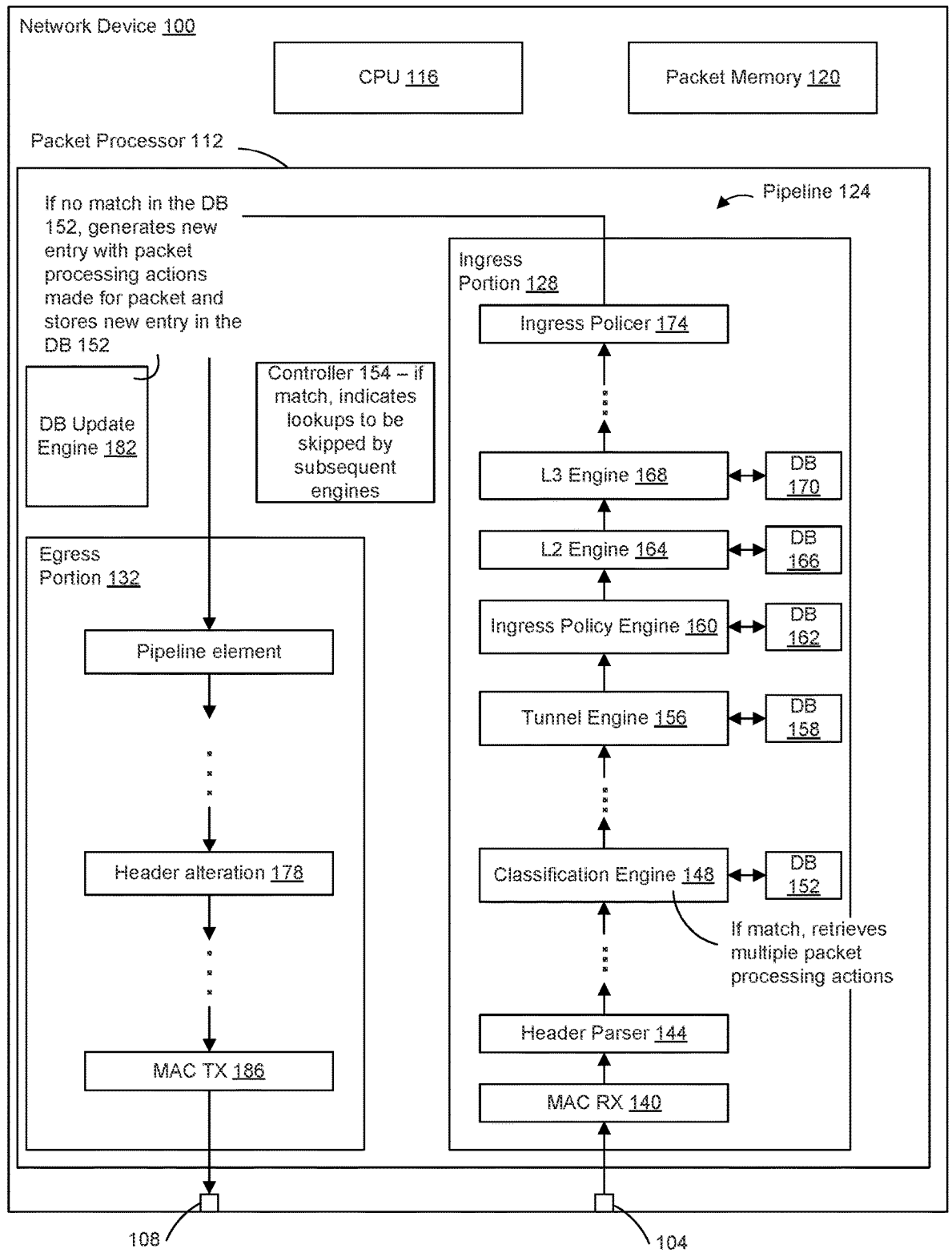
FIG. 1 is a simplified block diagram of an example network device, according to an embodiment.

In embodiments described below, a network device, such as a router, a switch, etc., includes a packet processor that is configured to process packets received by the network device to determine processing actions that are to be performed for the packets such as two or more of: i) making a forwarding decision for the packet, e.g., determine one or more ports of the network device that are to transmit the packet, ii) modifying the packet (e.g., modify a header of the packet) prior to transmitting the packet, iii) making one or more policing decisions regarding the packet, iv) making a packet counting decision (e.g., for policing and/or statistics generation) regarding the packet, v) determining whether the packet is to be dropped, mirrored to a central processing unit (CPU) of the network device, etc.

The packet processor includes a classification engine that is configured to perform lookups in a first database using a first lookup key corresponding to a received packet, e.g., the first lookup key includes header fields from one or more headers of the packet. The first database stores i) first lookup patterns that correspond to packet flows for which the packet processor has already determined multiple processing actions that are to be performed, and ii) indications of the multiple processing actions that are to be performed on packets that match the respective first lookup patterns. The packet processor also includes multiple other processing engines that are configured to perform respective lookups in respective second databases using respective second lookup keys corresponding to the packet, e.g., each second lookup key includes header fields from one or more headers of the packet. Each second database stores i) respective second lookup patterns, and ii) one or more indications of one or more processing actions to be performed on packets by the other processing engines that match the respective second lookup patterns.

For a packet received by the network device, the classification engine performs a lookup in the first database using a first lookup key corresponding to the packet. If the classification engine finds a matching first pattern for the packet in the first database, the first lookup engine i) informs the other processing engines that lookups in the second databases for the packet are to be skipped, and ii) informs the other processing engines of multiple processing actions to be performed on the packet based on indications of the multiple processing actions that are to be performed stored in the first database in association with the matching first pattern. In response, the other processing engines skip performing lookups in the second databases and perform the multiple processing actions indicated by the classification engine. In some embodiments, each such database lookup made by the other processing engines will add latency to the processing of a packet, and thus the other processing engines skipping the lookups in the second databases reduces the processing latency corresponding packets for which matching patterns in the first database are found.

On the other hand, if the classification engine does not find a matching first pattern in the first database that corresponds to the packet, each other processing engine performs a respective lookup for the packet in the respective second database and performs one or more processing actions based on the respective lookup in the respective second database. In some embodiments, the packet processor is configured to record i) processing actions that were, or will be, performed for the packet by the other processing engines based on the multiple lookups in the multiple second databases, and ii) a lookup pattern corresponding to the packet, e.g., the lookup pattern including header fields from one or more headers of the packet; and the packet processor then stores in the first database i) indications of the processing decisions made for the packet, and ii) the lookup pattern corresponding to the packet. Thus, when another packet that matches the lookup pattern that was added to the first database is subsequently received, the other processing engines can skip performing lookups in the second databases for the other packet as discussed above, and thus processing latency for the other packet is reduced.

In a typical communication network, less than approximately 10% of packet flows account for approximately 90% of traffic in the communication network. With such a makeup of traffic, a classification engine such as described above will likely find a match in the first database for a majority of packets received by a network device and thus lookups for those packets in the second databases are skipped, at least in some embodiments. Thus, the latency and/or power consumption caused by the lookups in the second databases for those packets is avoided, resulting in improved performance of the network device, at least in some embodiments.

FIG. 1 is a simplified block diagram of an example network device 100, according to an embodiment. The network device 100 includes a plurality of network interfaces 104, 108 that are configured to communicatively couple with other network devices via network links (not shown). Although two network interfaces 104, 108 are illustrated in FIG. 1 for simplicity, the network device 100 typically includes a suitable number of network interfaces greater than two.

The network device 100 also includes a packet processor 112 coupled to the network interfaces 104, 108 and a central processing unit (CPU) 116. The network device 100 also includes a packet memory 120 configured to store packets received by the network device 100 while the network device 100 is processing the packets.

The packet processor 112 is configured to process packets received via the network interfaces 104, 108 to determine network interfaces 104, 108 via which the packets are to be transmitted. The packet processor 112 is also configured to perform other suitable processing actions for packets received via the network interfaces 104, 108, such as one or more of i) modifying the packet (e.g., modify headers of the packets) prior to transmitting the packets, ii) making one or more policing decisions regarding the packets, iii) making packet counting decisions (e.g., for policing and/or statistics generation) regarding the packets, iv) determining whether packets are to be dropped, mirrored to the CPU 116, etc.

The packet processor 112 comprises a packet processing pipeline 124 having an ingress portion 128 and an egress portion 132. Each of the ingress portion 128 and an egress portion 132 includes a respective plurality of pipeline elements coupled in series.

Generally, each pipeline element optionally processes a packet, or a packet descriptor corresponding to the packet, and then passes the packet or the packet descriptor to the next element in the pipeline. A packet descriptor corresponds to metadata regarding a packet, such as information from the packet, such as some or all of the header information of the packet, in an embodiment. In some embodiments, the packet descriptor also includes information regarding a packet that was not included in the packet itself when the packet was received by the network device 100, such as an indicator of a location in the packet memory 120 at which the packet is stored, an indicator of a network interface 104, 108 via which the packet was received, a timestamp that indicates when the packet was received by the network device 100, an indication of an action to be performed by a pipeline element in connection with the packet that was determined by another pipeline element, an indication of whether a pipeline element is to skip processing related to the packet, etc. For ease of explanation, the term "packet" hereinafter is used to refer to a packet itself or to a packet descriptor associated with the packet. Each of one or more pipeline elements in the pipeline 124 may or may not process a particular packet. For example, in some instances, a pipeline element simply passes a packet to a next pipeline element in the pipeline 124. In an embodiment, a last pipeline element of the ingress portion 128 passes the packet to a first pipeline element of the egress portion 132. In an embodiment, the ingress portion 128 and the egress portion 132 are coupled via a fabric, a crossbar, etc. For example, the network device includes other pipelines (not shown) that are coupled to the fabric, the crossbar, etc., and ingress portions of other pipelines can transfer packets to the egress portion 132 via the fabric, the crossbar, etc., according to an embodiment. Similarly, the ingress portion 128 can transfer packets to egress portion of other pipelines via the fabric, the crossbar, etc., according to an embodiment.

Each or at least some of the pipeline element of the pipeline 124 includes, or otherwise is associated with, a corresponding memory, and a packet received by a pipeline element is stored in the memory associated with the pipeline element, according to an embodiment.

The ingress portion 128 includes a media access control (MAC) receiver element 140 coupled to at least some network interfaces 104, 108. The MAC receiver element 140 is configured to implement media access control functions associated with receiving packets via the network interfaces 104, 108. Additionally, the MAC receiver element 140 is configured to store packets received via the network interfaces 104, 108 in the packet memory 120. In an embodiment, the MAC receiver element 140 is also configured to generate packet descriptors for packets received via the network interfaces 104, 108 and to pass the packet descriptors to an elements in the pipeline 124. In an embodiment, a packet descriptor corresponding to a packet is generated to include an indicator of a location in the packet memory 120 at which the packet is stored. In some embodiments, the packet descriptor is generated to include an indicator of a network interface 104, 108 via which the packet was received. In some embodiments, the packet descriptor is generated to include a portion of the packet, such as an initial portion that includes header information of the packet. In other embodiments, the MAC receiver element 140 generates the packet descriptor to not include any portion of the packet. In some embodiments, the packet descriptor is generated to include a timestamp that indicates when the packet was received by the network device 100. In other embodiments, the MAC receiver element 140 generates the packet descriptor to not include a timestamp that indicates when the packet was received by the network device 100.

In an embodiment, the MAC receiver element 140 include direct memory access (DMA) circuitry for writing packet data to the packet memory 120, the packet data corresponding to packets received via the network interfaces 104, 108.

The ingress portion 128 also includes a header parser element 144 that is coupled to the MAC receiver element 140. The header parser element 144 is configured to parse header information in packets to identify, within the packets, header fields that are defined by one or more network communication protocols, in an embodiment. In an embodiment in which an initial portion of a packet is included in a packet descriptor corresponding to the packet, the header parser element 144 is configured to parse the initial portion of the packet within the packet descriptor to identify header fields, within the packet, that are defined by one or more network communication protocols. In another embodiment, the header parser element 144 is configured to parse an initial portion of the packet within the packet memory 120 to identify header fields, within the packet, that are defined by one or more network communication protocols.

The ingress portion 128 also includes a classification engine 148 that is coupled within the ingress portion 128 to receive packets output by the header parser element 144. The classification engine 148 is also coupled to a database 152. The classification engine 148 is configured to, for each packet received by the classification engine 148, determine a lookup key for the packet and use the lookup key to perform a lookup in the database 152. The database 152 stores lookup patterns that correspond to packet flows for which the packet processor 112 has already determined multiple processing actions that are to be performed on packets within the packet flow. The classification engine 148 is configured to compare the lookup key determined for a packet with the lookup patterns stored in the database 152 to determine whether the lookup key matches any of the lookup patterns.

The classification engine 148 is configured to generate the lookup key for the packet using multiple header fields from the packet. In an embodiment, the multiple header fields from the packet are header fields that were identified by the header parser element 144, according to an embodiment. The classification engine 148 generates the lookup key to also include information associated with the packet but that was not included within the packet when the packet was received by the network device 100, such as an indication of a network interface 104, 108 via which the packet were received, etc.

The database 152 also stores indications of multiple processing actions that are to be performed by the packet processor 112 on packets that match the respective lookup patterns.

Each lookup pattern stored in the database 152 corresponds to a respective set of header information of packets for which the same set of multiple processing actions are to be performed by the packet processor 112 in connection with the packets. In an embodiment, each lookup pattern corresponds to a packet flow. A packet flow is a group of packets that all include a same set of header information, according to an embodiment. As merely illustrative examples: the same set of header information includes a same destination address; the same set of header information includes a same destination address and a same source address; the same set of header information includes a same destination address and a same virtual local area network (VLAN) identifier (ID); the same set of header information includes a same destination address and a same destination transmission control protocol (TCP)/user datagram protocol (UDP) port; the same set of header information includes a same destination address, a same source address, a same source TCP/UDP port, and a same destination TCP/UDP port; the same set of header information includes a same destination address, a same source address, a same source TCP/UDP port, a same destination TCP/UDP port, and a same priority/quality of service (QoS) indicator; etc.

Each lookup pattern in the database 152 optionally also corresponds to information associated with packets but that are not included within the packets when received by the network device 100, such as an indication of a network interface 104, 108 via which the packets were received, etc.

As discussed above, the database 152 also stores, for each lookup pattern, a corresponding set of indications of multiple processing actions that are to be performed by the packet processor 112 on packets that match the lookup pattern. As merely an illustrative example, the set of indications of multiple processing actions includes: i) an indication of a set of one or more network interfaces 104, 108 via which the packet is to be forwarded; ii) an indication of a modification to be made to a header of the packet (e.g., remove a tunnel header, add a tunnel header, change a destination address, etc.) prior to transmitting the packet, iii) whether a policing policy is to be applied to the packets, iv) whether the packets are to be counted (e.g., for policing and/or statistics generation), v) whether the packets are to be dropped, mirrored to the CPU 116, etc. In an embodiment, the set of indications includes a flow identifier (ID) that identifies a flow to which the packet belongs. As will be discussed below, the flow ID indicates one or more processing actions that are to be performed in connection with a packet, in an embodiment.

As discussed above, the classification engine 148 compares the lookup key determined for a packet with the lookup patterns stored in the database 152 to determine whether the lookup key matches any of the lookup patterns. In response to determining that the lookup key matches a lookup pattern in the database 152, the classification engine 148 retrieves the corresponding set of indications of multiple processing actions that are to be performed by the packet processor 112 on packets that match the lookup pattern.

The multiple processing actions indicated by information retrieved from the database 152 are processing actions to be performed by subsequent pipeline elements in the pipeline 124. Therefore, the classification engine 148 informs the subsequent pipeline elements in the pipeline 124 of the multiple processing actions that are to be performed in connection with the packet. For example, the classification engine 148 stores the set of indications of multiple processing actions that are to be performed in the packet descriptor corresponding to the packet, in an embodiment.

As will be described further below, multiple other subsequent elements of the pipeline 124 are also configured to determine, based on multiple lookups within other databases that are associated with the other elements of the pipeline 124 that are subsequent to the classification engine 148, the multiple processing actions indicated by information in the database 152. Therefore, a controller 154 is configured to, in response to the classification engine 148 finding a matching lookup pattern for a packet in the database 152, controls other elements of the pipeline 124 that are subsequent to the classification engine 148 to skip multiple lookups within the other databases, which reduces the time required by the packet processor 112 to process the packet, at least in some embodiments.

On the other hand, in response to the classification engine 148 determining that the lookup key does not match any lookup patterns in the database 152, the controller 154 controls the multiple other elements of the pipeline 124 that are subsequent to the classification engine 148 go forward with the multiple lookups within the other databases, as will be described further below.

In an embodiment, the controller 154 is included within the classification engine 148 and the controller 154 includes within a packet descriptor an indication of whether the classification engine 148 found a match for a packet in the database 152. The other pipeline elements subsequent to the classification engine 148 then use the indication to determine whether to perform the multiple lookups within the other databases.

In another embodiment, the controller 154 is external to the classification engine 148 and is configured to: i) monitor whether the classification engine 148 found a match in the database 152 for a packet, and ii) generate control signals that indicate whether the other pipeline elements subsequent to the classification engine 148 are to perform the multiple lookups within the other databases.

The ingress portion 128 also includes a tunnel engine 156 that is coupled within the ingress portion 128 to receive packets output by the classification engine 148. The tunnel engine 156 is also coupled to a database 158. The tunnel engine 156 is configured to, for each of at least some packets received by the tunnel engine 156, determine a lookup key for the packet and selectively use the lookup key to perform a lookup in the database 158. The database 158 stores lookup patterns that correspond to i) packet flows for which the packet processor 112 is to add one or more tunnels headers to packets in connection with a start of a, and ii) packet flows for which the packet processor 112 is to add one or more tunnels headers to packets. The database 158 also stores indications of tunnel-related processing actions that are to be performed by the packet processor 112 on packets that match the respective lookup patterns.

Similar to the database 152, each lookup pattern stored in the database 158 corresponds to a respective set of header information of packets for which the same tunnel-related processing actions are to be performed by the packet processor 112 in connection with the packets. However, the size of each of the lookup patterns (i.e., the number of bits within the lookup pattern) in the database 158 is generally smaller than the sizes of lookup patterns in the database 152, according to an embodiment.

In an embodiment, each lookup pattern in the database 158 corresponds to a packet flow. Each lookup pattern in the database 158 optionally also corresponds to information associated with packets but that are not included within the packets when received by the network device 100, such as an indication of a network interface 104, 108 via which the packets were received, etc.

The database 158 also stores, for each lookup pattern, one or more indications of one or more tunnel-related processing actions that are to be performed by the packet processor 112 on packets that match the lookup pattern. As merely an illustrative example, one or more indications of tunnel-related processing actions includes: i) an indication of one or more tunnel headers to be added to packets that match the lookup pattern; and ii) an indication of one or more tunnel headers to be removed from packets that match the lookup pattern, etc.

As discussed above, the tunnel engine 156 selectively compares the lookup key determined for a packet with the lookup patterns stored in the database 158 to determine whether the lookup key matches any of the lookup patterns. In response to determining that the lookup key matches a lookup pattern in the database 158, the tunnel engine 156 retrieves the corresponding one or more indications of one or more tunnel-related processing actions that are to be performed by the packet processor 112 on packets that match the lookup pattern.

The one or more tunnel-related processing actions indicated by information retrieved from the database 158 include one or more tunnel-related processing actions to be performed by one or more subsequent pipeline elements in the pipeline 124, in an embodiment. As an illustrative example, a subsequent pipeline element performs header modifications such as adding tunnel headers and removing tunnel headers. Therefore, the tunnel engine 156 informs the one or more subsequent pipeline elements in the pipeline 124 of one or more tunnel-related processing actions that are to be performed in connection with the packet. For example, the tunnel engine 156 stores one or more indications of one or more tunnel-related processing actions that are to be performed in the packet descriptor corresponding to the packet, in an embodiment.

The tunnel engine 156 is configured to, when the classification engine 148 found a matching lookup pattern for the packet in the database 152, i) skip performing a lookup in the database 158, and ii) pass the packet descriptor to a next element in the pipeline 112. On the other hand, the tunnel engine 156 is configured to, when the classification engine 148 did not find a matching lookup pattern for the packet in the database 152, go forward with performing the lookup in the database 158. In some embodiments, the tunnel engine 156 processes the packet without performing a lookup in the database 158 for the packet in response to a control signal from the controller 154 and/or an indication in the packet descriptor that indicates the classification engine 148 found a matching lookup pattern for the packet in the database 152. In some embodiments, the controller 154 is configured to control pipeline 124 so that the packet bypasses the tunnel engine 156 when the classification engine 148 finds a matching lookup pattern for the packet in the database 152.

In an embodiment, the processing time required by the tunnel engine 156 to process a packet is longer when the tunnel engine 156 performs a lookup in the database 158 as compared to when the tunnel engine 156 skips performing the lookup in the database 158. In some embodiments, the packet is controlled to skip the tunnel engine 156 and therefore the lookup in the database 158 is skipped. Therefore, when the classification engine 148 finds a matching lookup pattern for a packet in the database 152 and as a result the tunnel engine 156 can skip performing a lookup in the database 158 for the packet, the time required by the tunnel engine 156 to process the packet is reduced, at least in some embodiments. Similarly, when pipeline 124 is controlled so that the packet skips the tunnel engine 156, the time required of the pipeline 124 to process the packet is reduced, in an embodiment.

Although the tunnel engine 156 was described above as determining both i) whether one or more tunnel headers should be added to a packet, and ii) whether one or more tunnel headers should be removed from the packet, in other embodiments two separate tunnel engines with respective databases respectively determine i) whether one or more tunnel headers should be added to a packet, and ii) whether one or more tunnel headers should be removed from the packet. In some such embodiments, both of the separate tunnel engines selectively perform tunnel lookups for a packet in separate databases based on whether the classification engine 148 found a matching lookup pattern for the packet in the database 152 in a manner similar to that described above with respect to the tunnel engine 156.

The ingress portion 128 also includes an ingress policy engine 160 that is coupled within the ingress portion 128 to receive packets output by the tunnel engine 156. The ingress policy engine 160 is also coupled to a database 162. The ingress policy engine 160 is configured to selectively assign flow IDs to packets to indicate packet flows to which packets belong, and one or more subsequent elements of the pipeline 124 use the flow IDs to determine processing actions to be performed in connection with the packets, according to an embodiment. For example, the one or more subsequent elements of the pipeline 124 perform different processing actions on packets depending on the flow ID. Thus, the flow IDs indicate to the one or more subsequent elements of the pipeline 124 processing actions that are to be performed on packets to which the flow IDs are assigned.

The ingress policy engine 160 is configured to, for each of at least some packets received by the ingress policy engine 160, determine a lookup key for the packet and selectively use the lookup key to perform a lookup in the database 162. The database 162 stores lookup patterns that correspond to respective packet flows. The database 162 also stores indications of flow IDs that correspond to respective lookup patterns, in an embodiment.

Similar to the database 152, each lookup pattern stored in the database 162 corresponds to a respective set of header information of packets for which the same processing actions are to be performed by the packet processor 112 in connection with the packets. However, the size of each of the lookup patterns (i.e., the number of bits within the lookup pattern) in the database 162 is generally smaller than the sizes of lookup patterns in the database 152, according to an embodiment.

In an embodiment, each lookup pattern in the database 162 corresponds to a packet flow. Each lookup pattern in the database 162 optionally also corresponds to information associated with packets but that are not included within the packets when received by the network device 100, such as an indication of a network interface 104, 108 via which the packets were received, etc.

The database 162 also stores, for each lookup pattern, a flow ID that corresponds to the lookup pattern and which indicates one or more processing actions that are to be performed for packets belonging to a packet flow corresponding to the flow ID.

As discussed above, the ingress policy engine 160 selectively compares the lookup key determined for a packet with the lookup patterns stored in the database 162 to determine whether the lookup key matches any of the lookup patterns. In response to determining that the lookup key matches a lookup pattern in the database 162, the ingress policy engine 160 retrieves a corresponding flow ID.

The ingress policy engine 160 is configured to, when the classification engine 148 finds a matching lookup pattern for the packet in the database 152, i) skip performing a lookup in the database 162, and ii) pass the packet descriptor to a next element in the pipeline 112. On the other hand, the ingress policy engine 160 is configured to, when the classification engine 148 does not find a matching lookup pattern for the packet in the database 152, go forward with performing the lookup in the database 162, at least for some packets. In some embodiments, the ingress policy engine 160 processes the packet without performing a lookup in the database 162 for the packet in response to a control signal from the controller 154 and/or an indication in the packet descriptor that indicates the classification engine 148 found a matching lookup pattern for the packet in the database 152. In some embodiments, the controller 154 is configured to control pipeline 124 so that the packet bypasses the ingress policy engine 160 when the classification engine 148 finds a matching lookup pattern for the packet in the database 152.

In an embodiment, the processing time required by the ingress policy engine 160 to process a packet is longer when the ingress policy engine 160 performs a lookup in the database 162 as compared to when the ingress policy engine 160 skips performing the lookup in the database 162. In some embodiments, the pipeline 124 is controlled so that the packet bypasses the ingress policy engine 160 and therefore the lookup in the database 162 is skipped. Therefore, when the classification engine 148 finds a matching lookup pattern for a packet in the database 152 and as a result the ingress policy engine 160 can skip performing a lookup in the database 162 for the packet, the time required by the ingress policy engine 160 to process the packet is reduced, at least in some embodiments. Similarly, when pipeline 124 is controlled so that the packet skips ingress policy engine 160, the time required of the pipeline 124 to process the packet is reduced, in an embodiment.

The ingress portion 128 also includes a layer-2 (L2) engine 164 that is coupled within the ingress portion 128 to receive packets output by the ingress policy engine 160. The L2 engine 164 is also coupled to a database 166. The L2 engine 164 is configured to selectively determine one or more network interfaces 104, 108 via which a packet is to be transmitted based on media access control (MAC) address information in the packet, VLAN information in the packet, and/or other suitable information in the packet and/or associated with the packet, according to an embodiment. When the L2 engine 164 determines the one or more network interfaces 104, 108 via which a packet is to be transmitted, the L2 engine 164 stores in the packet descriptor one or more indications of the one or more network interfaces 104, 108 via which a packet is to be transmitted, which are used by one or more subsequent elements of the pipeline 124 to forward the packet to the one or more network interfaces 104, 108 for transmission, in an embodiment.

The L2 engine 164 is configured to, for each of at least some packets received by the L2 engine 164, determine a lookup key for the packet and selectively use the lookup key to perform a lookup in the database 166. The database 166 stores lookup patterns that correspond to respective L2 information, such as MAC addresses. The database 166 also stores indications of network interfaces 104, 108 that correspond to respective lookup patterns, in an embodiment.

Similar to the database 152, each lookup pattern stored in the database 166 corresponds to a respective set of header information of packets that are to be forwarded to a same respective set of one or more network interfaces 104, 108. However, the size of each of the lookup patterns (i.e., the number of bits within the lookup pattern) in the database 166 is generally smaller than the sizes of lookup patterns in the database 152, according to an embodiment.

The L2 engine 164 is configured to, when the classification engine 148 finds a matching lookup pattern for the packet in the database 152, i) skip performing a lookup in the database 166, and ii) pass the packet descriptor to a next element in the pipeline 112. On the other hand, the L2 engine 164 is configured to, when the classification engine 148 does not find a matching lookup pattern for the packet in the database 152, go forward with performing the lookup in the database 166, at least for some packets. In some embodiments, the L2 engine 164 processes the packet without performing a lookup in the database 166 for the packet in response to a control signal from the controller 154 and/or an indication in the packet descriptor that indicates the classification engine 148 found a matching lookup pattern for the packet in the database 152. In some embodiments, the controller 154 is configured to control pipeline 124 so that the packet bypasses the L2 engine 164 when the classification engine 148 finds a matching lookup pattern for the packet in the database 152.

In an embodiment, the processing time required by the L2 engine 164 to process a packet is longer when the L2 engine 164 performs a lookup in the database 166 as compared to when the L2 engine 164 skips performing the lookup in the database 166. In some embodiments, the pipeline 124 is controlled so that the packet skips the L2 engine 164. Therefore, when the classification engine 148 finds a matching lookup pattern for a packet in the database 152 and as a result the L2 engine 164 can skip performing a lookup in the database 166 for the packet, the time required by the L2 engine 164 to process the packet is reduced, at least in some embodiments. Similarly, when pipeline 124 is controlled so that the packet skips the L2 engine 164, the time required of the pipeline 124 to process the packet is reduced, in an embodiment.

The ingress portion 128 also includes a layer-3 (L3) engine 168 that is coupled within the ingress portion 128 to receive packets output by the L2 engine 164. The L3 engine 168 is also coupled to a database 170. The L3 engine 168 is configured to selectively determine one or more network interfaces 104, 108 via which a packet is to be transmitted based on Internet Protocol (IP) address information in the packet, and/or other suitable information in the packet and/or associated with the packet, according to an embodiment. When the L3 engine 168 determines the one or more network interfaces 104, 108 via which a packet is to be transmitted, the L3 engine 168 stores in the packet descriptor one or more indications of the one or more network interfaces 104, 108 via which a packet is to be transmitted, which are used by one or more subsequent elements of the pipeline 124 to forward the packet to the one or more network interfaces 104, 108 for transmission, in an embodiment.

The L3 engine 168 is configured to, for each of at least some packets received by the L3 engine 168, determine a lookup key for the packet and selectively use the lookup key to perform a lookup in the database 170. The database 170 stores lookup patterns that correspond to respective L3 information, such as IP addresses. The database 170 also stores indications of network interfaces 104, 108 that correspond to respective lookup patterns, in an embodiment.

Similar to the database 152, each lookup pattern stored in the database 170 corresponds to a respective set of header information of packets that are to be forwarded to a same respective set of one or more network interfaces 104, 108. However, the size of each of the lookup patterns (i.e., the number of bits within the lookup pattern) in the database 170 is generally smaller than the sizes of lookup patterns in the database 152, according to an embodiment.

The L3 engine 168 is configured to, when the classification engine 148 found a matching lookup pattern for the packet in the database 152, i) skip performing a lookup in the database 170, and ii) pass the packet descriptor to a next element in the pipeline 112. On the other hand, the L3 engine 168 is configured to, when the classification engine 148 did not find a matching lookup pattern for the packet in the database 152, go forward with performing the lookup in the database 170, at least for some packets. In some embodiments, the L3 engine 168 processes the packet without performing a lookup in the database 170 for the packet in response to a control signal from the controller 154 and/or an indication in the packet descriptor that indicates the classification engine 148 found a matching lookup pattern for the packet in the database 152. In some embodiments, the controller 154 is configured to control pipeline 124 so that the packet bypasses the L3 engine 168 when the classification engine 148 finds a matching lookup pattern for the packet in the database 152.

In an embodiment, the processing time required by the L3 engine 168 to process a packet is longer when the L3 engine 168 performs a lookup in the database 170 as compared to when the L3 engine 168 skips performing the lookup in the database 170. Therefore, when the classification engine 148 finds a matching lookup pattern for a packet in the database 152 and as a result the L3 engine 168 can skip performing a lookup in the database 170 for the packet, the time required by the L3 engine 168 to process the packet is reduced, at least in some embodiments. Similarly, when pipeline 124 is controlled so that the packet skips the L3 engine 168, the time required of the pipeline 124 to process the packet is reduced, in an embodiment.

The L2 engine 164 and the L3 engine 168 are examples of forwarding engines that are configured to determine, for each of at least some packets, one or more network interfaces via which the packet is to be transmitted based on network address information in the packet; and the databases 166, 170 are examples of forwarding databases that store associations between network address information and network interfaces.

The ingress portion 128 also includes an ingress policer engine 174 that is coupled within the ingress portion 128 to receive packets output by the L3 engine 168. The ingress policer engine 174 is configured to perform rate limiting, makes flow traffic measurements, and stores flow measurement information in flow entries. The ingress policer engine 174 performs different processing actions (e.g., rate limiting, counting, etc.) depending on the flow to which a packet belongs, in an embodiment. To this end, the ingress policer engine 174 utilizes flow IDs assigned to packets (e.g., by the first classification engine 148, the ingress policy engine 160, etc.) to determine processing actions that are to be performed for a packet, in an embodiment.

The egress portion 132 includes a plurality of pipeline elements including a header alteration engine 178. The header alteration engine 178 is configured to modify headers of packets based on information received from previous elements of the pipeline 124, such as the first classification engine 148, the tunnel engine 156, the L2 engine 164, the L3 engine 168, etc. For example, the header alteration engine 178 is configured to add tunnel headers to packets, remove tunnel headers from packets, modify destination addresses in packet header, etc.

The egress portion 132 also includes a MAC transmit element 186 coupled to at least some network interfaces 104, 108. The MAC transmit element 186 is configured to implement media access control functions associated with transmitting packets via the network interfaces 104, 108. Additionally, the MAC transmit element 186 is configured to retrieve packet data from the packet memory 120 and providing the packet data to the network interfaces 104, 108 for transmission. In an embodiment, the MAC transmit element 186 receives indicators of locations of packets in the packet memory 120 and uses the indicators of locations to retrieve packet data from the packet memory 120. In an embodiment, the MAC transmit element 186 include DMA circuitry for reading packet data from the packet memory 120.

The packet processor 112 also includes a database update engine 182 that is configured to update the database 152 associated with the classification engine 148. For example, when the classification engine 148 did not find a matching lookup pattern in the database 152, the database update engine 182 generates a new lookup pattern corresponding to the packet (to be stored in the database 152) based on header information in the packet and, optionally, other information associated with the packet (such as an indication of a network interface 104, 108 via which the packet was received) that was not included in the packet when received by the network device 100. Also when the classification engine 148 did not find a matching lookup pattern in the database 152, the database update engine 182 determines a set of multiple processing actions that were performed (and/or will be performed) for the packet based on multiple lookups in multiple other databases of the packet processor 112. For example, the database update engine 182 determines a set of multiple lookup results determined by multiple other processing engines (e.g., two or more of the tunnel engine 156, the ingress policy engine 160, the L2 engine 164, the L3 engine 168) associated with multiple other databases (e.g., the databases 158, 162, 166, 170) of the packet processor 112. The database update engine 182 then adds a new entry to the database 152, the new entry including i) the new lookup pattern, and ii) one or more indications of the set of multiple processing actions that were performed (and/or will be performed) for the packet based on the multiple lookups in multiple other databases of the packet processor 112.

In an embodiment, the database update engine 182, in response to determining that the classification engine 148 did not find a matching lookup pattern in the database 152 for a packet, the database update engine 182 records the lookup keys used by multiple processing engines (e.g., two or more of the tunnel engine 156, the ingress policy engine 160, the L2 engine 164, the L3 engine 168) associated with multiple other databases (e.g., the databases 158, 162, 166, 170) of the packet processor 112 for processing the packet, and uses the recorded lookup keys to generate the new lookup pattern corresponding to the packet. For example, the database update engine 182 generates the new lookup pattern (to be stored in the database 152) corresponding to the packet to include all information included in all of the lookup keys used by the multiple processing engines for processing the packet.

In another embodiment, the database update engine 182 is configured to add a new lookup pattern to the database 152 (in a manner similar to that described above) in response to receiving a suitable minimum number of multiple packets belonging to a same flow and for which the classification engine 148 did not find a matching lookup pattern in the database 152.

In some embodiments, the packet processor 112 performs an aging process to keep track of respective time durations that entries have been in the database 152, and/or respective time durations since entries in the database 152 were last matched and/or used, and/or respective numbers of times that entries in the database 152 were matched and/or used during a suitable time period. In some such embodiments, the aging process performed by the packet processor 112 removes entries from the database 152 that have not been matched and/or used for a suitable period of time and/or were used a least number of times during the suitable time period. Additionally or alternatively, when the database update engine 182 is to add a new entry to the database 152 and the database 152 is full, the database update engine 182 deletes selects an entry in the database 152 to remove and removes the selected entry, according to some embodiments. For example, in response to determining that a new entry is to be added to the database 152 and the database 152 is full, the database update engine 182 selects for deletion i) an oldest entry in the database 152, ii) an entry in the database 152 that has not been matched and/or accessed for a longest time duration, iii) an entry in the database 152 that was matched and/or accessed a least number times during a suitable time duration, etc.

In some embodiments, the packet processor 112 is configured to flush the database 152 in response to suitable events that tend to occur at rates that are much lower than a rate at which the packet processor 112 processes packets. Illustrative examples of events that prompt the packet processor 112 to flush the database 152 include i) a change in an access control list (ACL) used by the packet processor 112, ii) changes to one or more forwarding databases and/or tunnel-related databases (e.g., the databases 158, 166, 170) as a result of network routing and/or path changes, additions of new network routes and/or paths, etc., iii) port failures, iv) link failures, etc. In some embodiments, the packet processor 112 additionally or alternatively is configured to flush the database 152 periodically.

In operation, when a packet is received by the network device 100, the packet processor 112 stores (e.g., the MAC receive element 140 stores) the packet in the packet memory 120. Additionally, the packet processor 112 parses (e.g., the header parser engine 144 parses) header information from the packet to identify a plurality of header fields in the packet.

Further, the classification engine 148 generates a lookup key for the packet based on header fields identified by the packet processor 112 (e.g., by the header parser engine 144), and compares the lookup key to lookup patterns stored in the database 152.

In response to the classification engine 148 finding a match to the lookup key in the database 152, the classification engine 148 retrieves one or more indications of multiple processing actions that the packet processor 112 is to perform for the packet, and provides the one or more indications of multiple processing actions to other components of the packet processor 112 (e.g., subsequent pipeline elements in the pipeline 124). Additionally, the classification engine 148 informs other components of the packet processor 112 (e.g., subsequent pipeline elements in the pipeline 124) that multiple other database lookups for the packet are to be skipped. For example, the classification engine 148 informs other components of the packet processor 112 (e.g., subsequent pipeline elements in the pipeline 124) that a match to the lookup key in the database 152 was found, which indicates that the multiple other database lookups for the packet are to be skipped.

In response to the classification engine 148 indicating that a match to the lookup key in the database 152 was found, the packet processor 112 skips (e.g., subsequent pipeline elements in the pipeline 124 skip) the multiple other database lookups for the packet. Additionally, in response to the one or more indications, from the classification engine, of multiple processing actions that the packet processor 112 is to perform for the packet, the packet processor 112 performs (e.g., subsequent pipeline elements in the pipeline 124 perform) the multiple processing actions.

On the other hand, in response to the classification engine 148 determining that there is not a match to the lookup key in the database 152, the classification engine 148 informs other components of the packet processor 112 (e.g., subsequent pipeline elements in the pipeline 124) that there is not a match to the lookup key in the database 152. In response, the other components of the packet processor 112 (e.g., subsequent pipeline elements in the pipeline 124) go forward with the multiple other database lookups for the packet to determine multiple processing actions to be performed for the packet. Additionally, the database update engine 182 generates a new lookup pattern corresponding to the packet (to be stored in the database 152) based on header information in the packet and, optionally, other information associated with the packet (such as an indication of a network interface 104, 108 via which the packet was received) that was not included in the packet when received by the network device 100. Further, the database update engine 182 determines a set of multiple processing actions that were performed (and/or will be performed) for the packet based on multiple lookups in multiple other databases of the packet processor 112. For example, the database update engine 182 determines a set of multiple lookup results determined by multiple other processing engines (e.g., two or more of the tunnel engine 156, the ingress policy engine 160, the L2 engine 164, the L3 engine 168) associated with multiple other databases (e.g., the databases 158, 162, 166, 170) of the packet processor 112. The database update engine 182 then adds a new entry to the database 152, the new entry including i) the new lookup pattern, and ii) one or more indications of the set of multiple processing actions that were performed (and/or will be performed) for the packet based on the multiple lookups in multiple other databases of the packet processor 112.

In some embodiments, when a database lookup is to be skipped (e.g., lookups in the databases 158, 162, 166, 170), the pipeline 124 is configured to cause the packet to bypass the pipeline element that performs the database lookup (e.g., the tunnel engine 156, the ingress policy engine 160, the L2 engine 164, the L3 engine, etc.).

In an embodiment, the database 152 comprises a content addressable memory (CAM), such as a ternary CAM (TCAM). For example, a TCAM of the database 152 stores lookup patterns, and the classification engine 148 applies a lookup key to an input of the TCAM to determine whether the lookup key matches any lookup patterns in the TCAM.

Although the packet processor 112 was described as having a pipeline architecture, in other embodiments the packet processor 112 has another suitable structure such as structure in which some or all of the classification engine 148, the tunnel engine 156, the ingress policy engine 160, the L2 engine 164, and the L3 engine 168 are capable of processing a packet in parallel.

Figure 2:
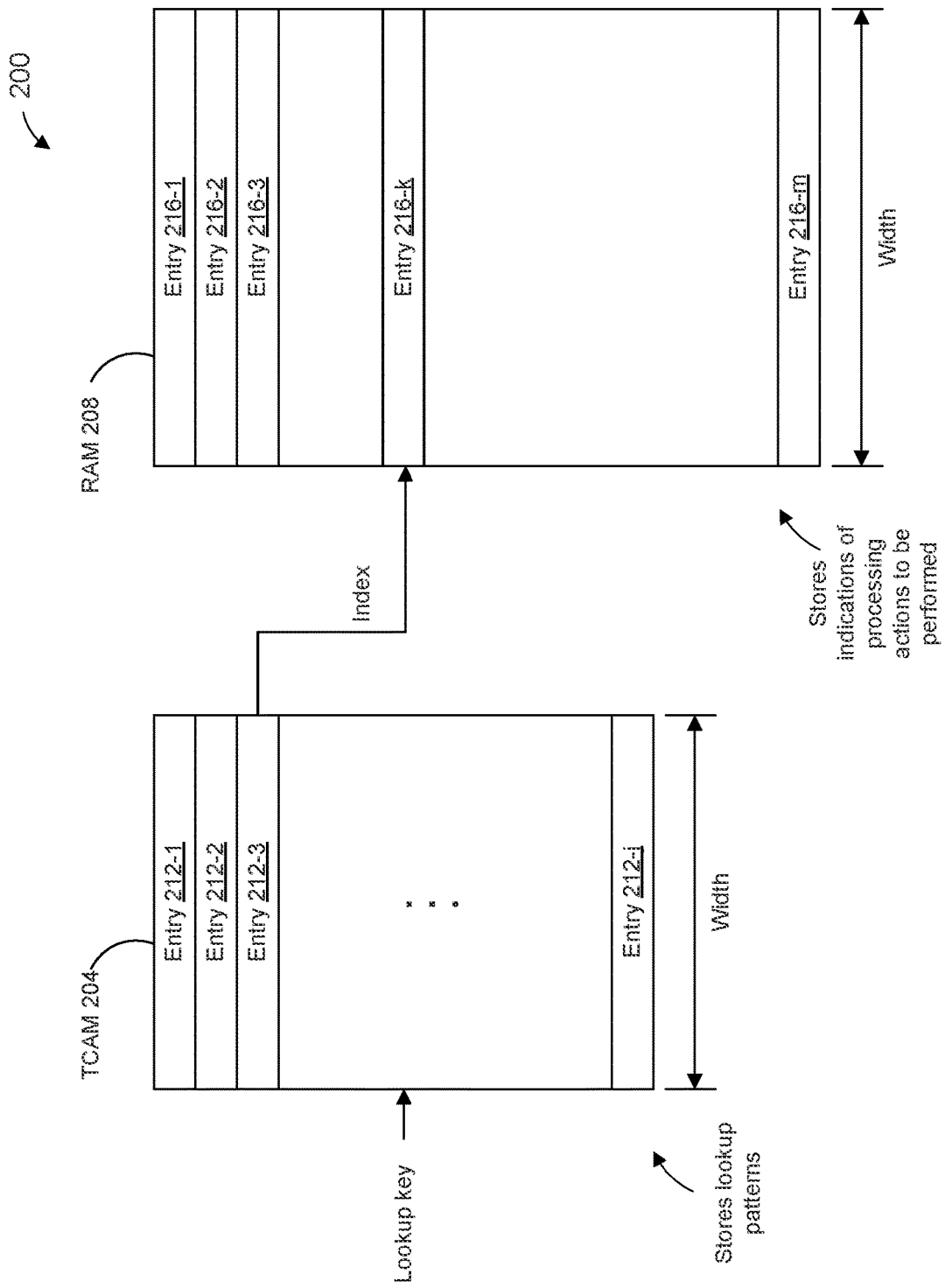
FIG. 2 is a simplified block diagram of an example database used in the network device of FIG. 1, according to an embodiment.

FIG. 2 is a diagram of an example database 200 that is used as the database 152, according to an embodiment, and FIG. 2 is described with reference to FIG. 1 for ease of explanation. In other embodiments, the example database 200 is used with another suitable network device different than the network device 100 of FIG. 1. Similarly, the network device 100 uses another suitable database, different than the database 200, for the database 152, in some embodiments.

The database 200 includes a TCAM 204 coupled to a random access memory (RAM) 208. The TCAM 204 includes a plurality of entries 212. Each of at least some of the entries 212 stores a respective lookup pattern such as described above with reference to the database 152 of FIG. 1. The RAM 208 includes a plurality of entries 216. Each of at least some of the entries 216 is associated with a respective entry 212 of the TCAM and stores a respective set of one or more indications of multiple processing actions to be performed for a packet that matches the lookup pattern in the corresponding TCAM entry 212.

A classification engine, such as the classification engine 148 (FIG. 1), applies a lookup key to an input of the TCAM 204. When the TCAM 204 determines that the lookup key matches a lookup pattern within the TCAM 204, the TCAM 204 outputs an index that indicates which TCAM entry 212 matches the lookup key. The database 200 uses the index to select an entry 216 in the RAM 208 that corresponds to the TCAM entry 212 that matches the lookup key, and the database 200 outputs the set of one or more indications of multiple processing actions stored within the selected entry 216 of the RAM 208. In the example illustration of FIG. 2, the TCAM entry 212-3 matches the lookup key, and the RAM entry 216-$k$ corresponds to the TCAM entry 212-3. Thus, the database 200 uses the index output by the TCAM 204 to retrieve the set of one or more indications of multiple processing actions stored within the entry 216-$k$.

A size of the TCAM 204 can be measured in a number of entries 212 and a width of the entries 212 in bits, for example. The cost of the TCAM 204 generally increases as the size of the TCAM 204 increases.

In various embodiments, one or more of the databases 158, 162, 166, 170 have a structure similar to the database 200. In such embodiments, the respective widths of the TCAMs one or more of the databases 158, 162, 166, 170 typically are smaller than the width of the TCAM 204 because the lookup patterns stored in the databases 158, 162, 166, 170 are typically smaller than lookup patterns stored in the TCAM 204. On the other hand, the number of entries in the TCAM 204 is typically smaller than respective numbers of entries in the TCAMs of the one or more of the databases 158, 162, 166, 170. For example, because less than approximately 10% of packet flows account for approximately 90% of traffic in a typical communication network, the TCAM 204 can be targeted for those approximately 10% of packet flows and can thus be chosen to have less entries than TCAMs of the one or more of the databases 158, 162, 166, 170.

Databases that use TCAMs tend to have lower latency (with regard to searching for matches with lookup patterns as discussed above) as compared to databases that do not use TCAMs, such as databases that store lookup patterns in a RAM or another suitable non-CAM memory. On the other hand, databases with TCAMs tend to be more expensive than databases that do not use CAMs.

As discussed above, with network devices that utilize a classification engine such as the classification engine 148 described above, the respective rates at which other lookups are performed by other elements of the packet processor 112 is reduced as compared to a network device that omits the classification engine. Thus, in some embodiments, one or more other lookups (such as lookups in one or more of the databases 158, 162, 166, 170) can be performed using slower databases that do not use TCAMs (such as databases that store lookup patterns in RAMs or other suitable non-CAM memories), thus reducing costs of the network device.

Figure 3:
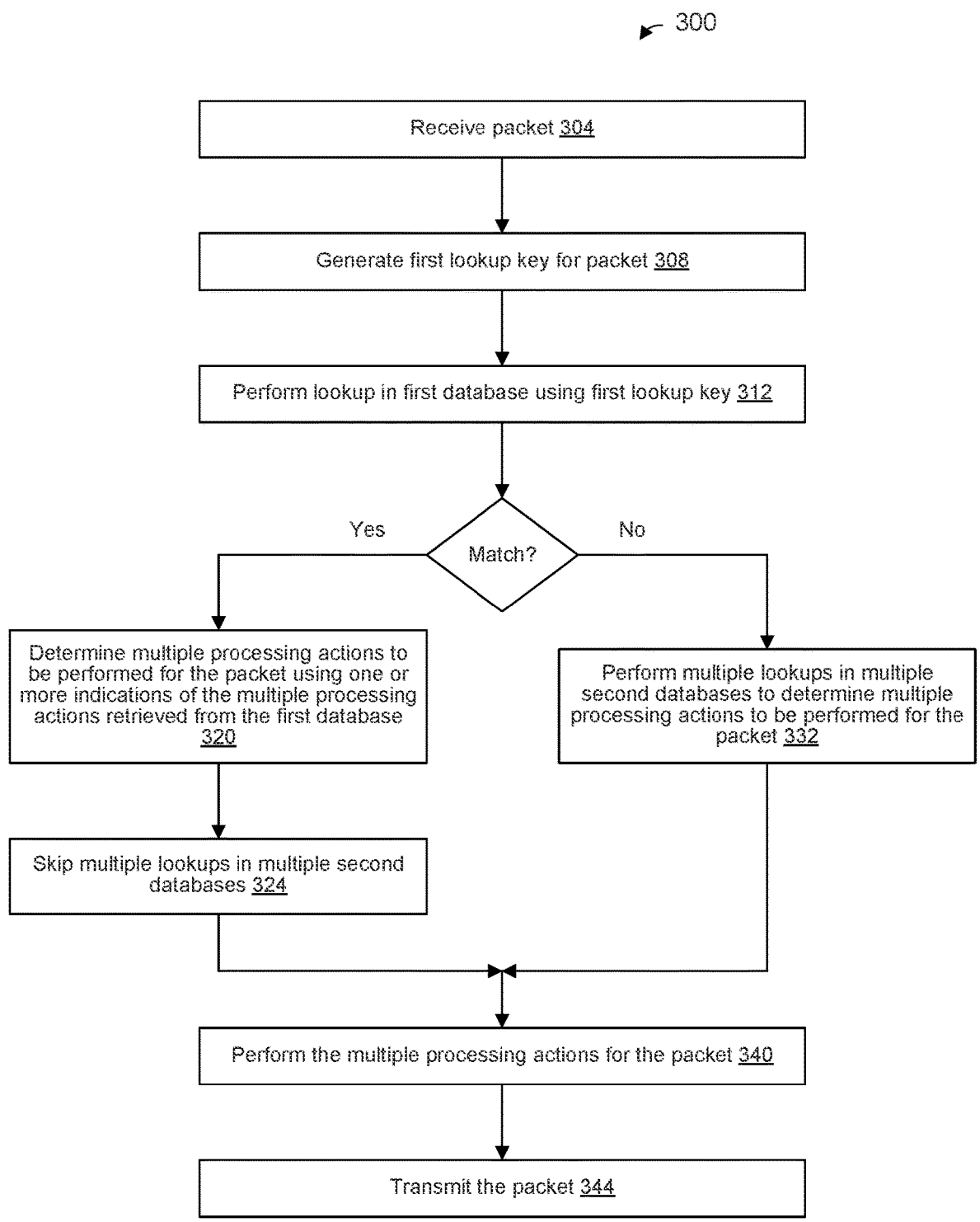
FIG. 3 is a simplified flow diagram of an example method of processing a packet performed by the network device of FIG. 1, according to another embodiment.

FIG. 3 is a simplified flow diagram of an example method 300 for processing a packet in a network device, according to an embodiment. The method 300 is performed by the network device 100 of FIG. 1, in an embodiment, and the method 300 is described with reference to FIG. 1 for ease of explanation. In other embodiments, the method 300 is implemented by another suitable network device. Also, the network device 100 implements a suitable method for processing packets different than the example method 300, in an embodiment.

At block 304, the network device receives a packet. For example, the network device 100 receives a packet via a network interface 104, 108.

At block 308, the network device generate a first lookup key for the packet received at block 304 using header information from the packet. For example, the packet processor 112 generates (e.g., the classification engine 148 generates) the first lookup key using header information from the packet. In an embodiment, after receiving the packet at block 304, the network device parses (e.g., the packet processor 112 parses, the header parser element 144 parses, etc.) header information in the packet to identify header fields of the packet, and generating the first lookup key at block 308 includes generating the first lookup key using header fields identified as a result of parsing the header information. In an embodiment, the multiple header fields from the packet are header fields that were identified by the header parser element 144, according to an embodiment. Generating the first lookup key at block 308 includes generates the lookup key to also include information associated with the packet but that was not included within the packet when the packet was received by the network device 100, such as an indication of a network interface 104, 108 via which the packet were received, etc.

In an embodiment, generating the first lookup key at block 308 is performed after the network device 100 has completed parsing the header information of the packet (e.g., after the packet processor 112 has completed parsing the header information of the packet, after the header parser engine 144 has completed parsing the header information of the packet, etc.).

At block 312, the network device performs a lookup in a first database of the network device using the first lookup key generated at block 312. For example, the packet processor 112 performs a lookup (e.g., the classification engine 148 performs a lookup) in the database 152 using the first lookup key. Performing the lookup at block 312 includes determining whether the lookup key matches a lookup pattern stored in the first database.

In response to determining that the lookup key matches a lookup pattern stored in the first database, the flow proceeds to block 320. At block 320, the network device determines multiple processing actions to be performed for the packet using one or more indications of the multiple processing actions retrieved from the first database as part of the lookup performed at block 312. For example, when the lookup key matches a lookup pattern in the first database, the lookup performed at block 312 retrieves from the first database corresponding one or more indications of the multiple processing actions that are to be performed. The network device 100 determines (e.g., the packet processor 112 determines, the pipeline 124 determines, the classification engine 148 determines, etc.) the multiple processing actions, in an embodiment.

At block 328, multiple lookups in multiple second databases are skipped. For example, lookups in at least two of the databases 158, 162, 166, and 170 are skipped.

On the other hand, in connection with the lookup in the first database performed at block 312, the flow proceeds to block 332 in response to determining that the lookup key does not match any lookup patterns stored in the first database. At block 332, the network device performs multiple lookups in the multiple second databases of the network device to determine the multiple processing actions to be performed for the packet. For example, the packet processor 112 performs multiple lookups in multiple second database (e.g., two or more of: the tunnel engine 156 performs a lookup in the database 158; the ingress policy engine 160 performs a lookup in the database 162; the L2 engine 164 performs a lookup in the database 166; the L3 engine 168 performs a lookup in the database 170; etc.). In connection with performing each lookup in a respective second database, the method 300 also includes generating a respective lookup key. Additionally, performing each lookup at block 332 includes determining whether the respective lookup key matches a lookup pattern stored in the respective second database.

After the block 324 and after the block 332, the flow proceeds to block 340. At block 340, the multiple processing actions determined at block 324, or determined at block 332, are performed by the network device.

At block 344, the network device transmits the packet via one or more network interfaces of the network device after performing the multiple processing actions at block 340. In some instances, block 344 is not performed such as when the multiple processing actions include dropping the packet.

Figure 4:
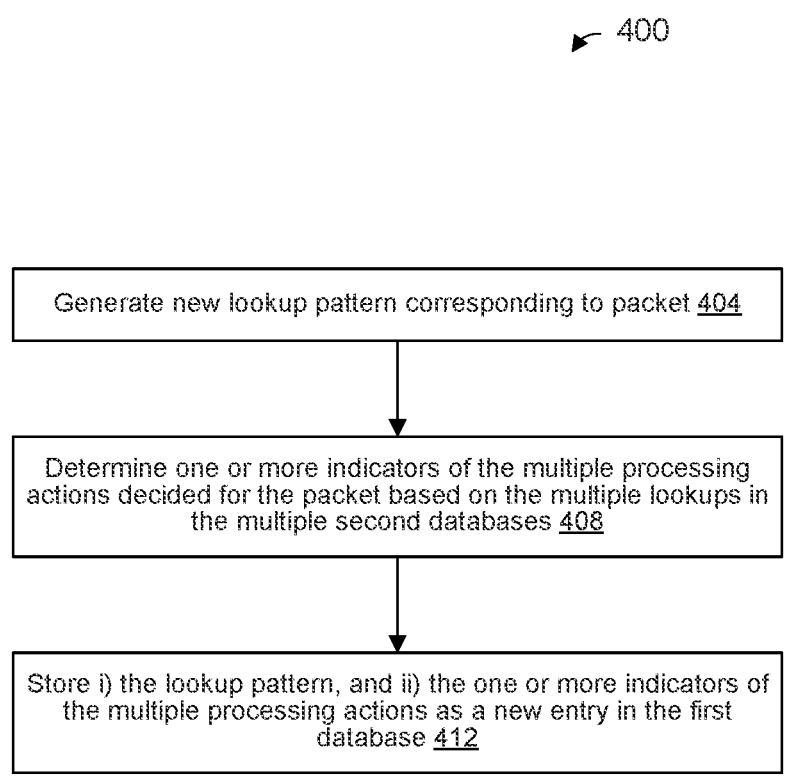
FIG. 4 is simplified flow of an example method of updating a database of the network device of FIG. 1, according to an embodiment.

FIG. 4 is a simplified flow diagram of an example method 400 for updating a database of a network device, such as the database 152, according to another embodiment. The method 400 is performed by the network device 100 of FIG. 1, in an embodiment, and the method 400 is described with reference to FIG. 1 for ease of explanation. In other embodiments, the method 400 is implemented by another suitable network device. Also, the network device 100 implements a suitable method for updating a database different than the example method 400, in an embodiment.

In an embodiment, the method 400 is performed in response to the network device determining (e.g., the packet processor 112 determining, the pipeline 124 determining, the classification engine 148 determining, etc.) that no match in the database 152 for a packet was determined.

At block 404, the network device generates (e.g., the packet processor 112 generates, the pipeline 124 generates, the database update engine 182 generates, etc.) a new lookup pattern corresponding to the packet. In an embodiment, generating the new lookup pattern includes using the plurality of second lookup keys used (e.g., by the tunnel engine 156, the ingress policy engine 160, the L2 engine 164, the L3 engine, etc.) to perform the second lookups in the second databases. For example, the generating the new lookup pattern at block 404 includes generating the new lookup pattern to include all of the information included in the plurality of second lookup keys.

At block 408, the network device determines (e.g., the packet processor 112 determines, the pipeline 124 determines, the database update engine 182 determines, etc.) a plurality of processing actions that were performed by the network device in connection with the packet. For example, the network device records (e.g., the packet processor 112 records, the pipeline 124 records, the database update engine 182 records, etc.) indications of the plurality of processing actions that were output by second lookup engines in connection with performing the second lookups, and uses the recorded indications of the plurality of processing actions to determine a plurality of processing actions that were performed by the network device in connection with the packet, in an embodiment.

At block 412, the network device stores (e.g., the packet processor 112 stores, the pipeline 124 stores, the database update engine 182 stores, etc.) in the first database a new entry that includes i) the new lookup pattern generated at block 404, and ii) one or more indications of the plurality of processing actions that were determined at block 408.

Embodiment 1: A network device for processing packets, the network device comprising: a plurality of network interfaces; and a packet processor coupled to the plurality of network interfaces, the packet processor configured to process packet headers of packets received via the plurality of network interfaces to determine network interfaces via which the packets are to be transmitted. The packet processor comprises: a header parser engine configured to, for each of at least some of the packets, parse a header portion of the packet to identify header fields in the packet that are defined by one or more network communication protocols; a first lookup engine coupled to a first database, the first lookup engine configured to, for each of at least some of the packets: i) generate a first lookup key using a plurality of header fields identified by the header parser engine, ii) perform a first lookup in the first database for the packet using the first lookup key, and iii) in response to finding a match of the first lookup key in the first database, determine a plurality of processing actions to be performed by the packet processor in connection with the packet; a plurality of second lookup engines, each second lookup engine configured to, for each of at least some of the packets: i) selectively perform a respective second lookup in a respective second database for the packet using a respective second lookup key that includes a respective set of one or more header fields identified by the header parser engine, and ii) selectively determine, based on the second lookup, one or more processing actions to be performed by the packet processor in connection with the packet; and a controller configured to cause the plurality of second lookup engines to skip performing the second lookups for the packet in response to the first lookup engine finding the match of the first lookup key in the first database.

Embodiment 2: The network device of embodiment 1, wherein: the controller is configured to, for each of at least some of the packets, modify a packet descriptor corresponding to the packet to include an indication of whether the first lookup engine found the match of the first lookup key in the first database; and each second lookup engine is configured to, for each of at least some of the packets, analyze the indication in the packet descriptor to determine whether to perform the respective second lookup in the respective second database for the packet.

Embodiment 3: The network device of embodiment 1, wherein: the controller is configured to, for each of at least some of the packets, generate one or more control signals that indicate whether the whether the first lookup engine found the match of the first lookup key in the first database; and each second lookup engine is configured to, for each of at least some of the packets, determine whether to perform the respective second lookup in the respective second database for the packet based on a respective one of the one or more control signals.

Embodiment 4: The network device of embodiment 1, wherein the controller is configured to, for each of at least some of the packets: generate one or more control signals configured to cause a packet descriptor corresponding to the packet to bypass the plurality of second lookup engines when the first lookup engine finds the match of the first lookup key in the first database.

Embodiment 5: The network device of embodiment 1, wherein: the packet processor is configured to cause the packet descriptor corresponding to the packet to bypass the plurality of second lookup engines when the first lookup engine finds the match of the first lookup key in the first database.

Embodiment 6: The network device of any of embodiments 1-5, wherein: the packet processor comprises a pipeline having a plurality of pipeline element arranged sequentially in an order, the pipeline including the first lookup engine and the plurality of second lookup engines; and the first lookup engine is located within the pipeline prior to the plurality of second lookup engines according to the order so that, for each at least some of the packets, the first lookup engine determines whether the first database includes the match of the first lookup key prior to the plurality of second lookup engines starting the second lookups.

Embodiment 7: The network device of any of embodiments 1-6, wherein: the first lookup engine is configured to, in response to finding the match of the first lookup key in the first database, retrieve from the first database at least i) an identifier of a flow to which the packet belongs, and ii) one or more identifiers of one or more network interfaces, among the plurality of network interfaces, via which the packet is to be transmitted; and the plurality of second lookup engines includes: a policy engine that is configured to use the respective second lookup key to perform a lookup in the respective second database to determine the identifier of the flow to which the packet belongs, and a forwarding engine that is configured to use the respective second lookup key to perform a lookup in the respective second database to determine the one or more identifiers of one or more network interfaces, among the plurality of network interfaces, via which the packet is to be transmitted.

Embodiment 8: The network device of any of embodiments 1-7, wherein: the first lookup engine is configured to, in response to finding the match of the first lookup key in the first database, retrieve from the first database at least i) an indication of whether a tunnel header is to be added to the packet, and ii) one or more identifiers of one or more network interfaces, among the plurality of network interfaces, via which the packet is to be transmitted; and the plurality of second lookup engines includes: a tunnel engine that is configured to use the respective second lookup key to perform a lookup in the respective second database to determine whether the tunnel header is to be added to the packet, and a forwarding engine that is configured to use the respective second lookup key to perform a lookup in the respective second database to determine the one or more identifiers of one or more network interfaces, among the plurality of network interfaces, via which the packet is to be transmitted.

Embodiment 9: The network device of any of embodiments 1-8, wherein the packet processor further comprises: a database update engine configure to, in response to the first lookup engine determining that a match of the first lookup key is not found in the first database: generate a new lookup pattern corresponding to the packet, determine a plurality of processing actions that were performed by the packet processor for the packet, and store in the first database a new entry that includes i) the new lookup pattern, and ii) one or more indications of the plurality of processing actions that were performed by the packet processor in connection with the packet.

Embodiment 10: The network device of embodiment 9, wherein the database update engine is configured to, in response to the first lookup engine determining that the match of the first lookup key is not found in the first database: generate the new lookup pattern using the plurality of second lookup keys used by the plurality of second lookup engines to perform the second lookups in the second databases.

Embodiment 11: The network device of embodiment 10, wherein the database update engine is configured to, in response to the first lookup engine determining that the match of the first lookup key is not found in the first database: generate the new lookup pattern to include all of the information included in the plurality of second lookup keys.

Embodiment 12: A method for processing a packet in a network device, the method comprising: receiving a packet via a network interface among a plurality of network interfaces of the network device; parsing, at a packet processor of the network device, a header portion of the packet to identify header fields in the packet that are defined by one or more network communication protocols; generating, at the packet processor, a first lookup key for the packet using a plurality of header fields identified by the parsing of the header portion of the packet; performing, at the packet processor, a first lookup in a first database using the first lookup key; in response to determining there is a match of the first lookup key in the first database, determining, by the packet processor, a plurality of processing actions to be performed by the network device in connection with the packet based on information in the first database corresponding to the match of the first lookup key in the first database; in response to determining that there is no match of the first lookup key in the first database; performing, at the packet processor, a plurality of second lookups in a plurality of second databases using a plurality of second lookup keys, the plurality of second lookup keys having been generated using one or more header fields identified by the parsing of the header portion of the packet, and determining, at the packet processor, the plurality of processing actions to be performed by the network device in connection with the packet based on information in the second databases corresponding to matches of the second lookup keys in the second databases; in response to determining that there is the match of the first lookup key in the first database, skipping performing the plurality of second lookups for the packet; and performing, by the network device, the plurality of processing actions for the packet.

Embodiment 13: The method for processing the packet of embodiment 12, further comprising: modifying, by the packet processor, a packet descriptor corresponding to the packet to include an indication of whether there is the match of the first lookup key in the first database; and in connection with each second lookup, analyzing, by the packet processor, the indication in the packet descriptor to determine whether to perform the second lookup in the second database for the packet.

Embodiment 14: The method for processing the packet of embodiment 12, further comprising: generating, by the packet processor, one or more control signals that indicate whether there is the match of the first lookup key in the first database; and in connection with each second lookup, determining, at the packet processor, whether to perform the second lookup in the second database for the packet based on a respective one of the one or more control signals.

Embodiment 15: The method for processing the packet of embodiment 12, further comprising: generating, at the packet processor, one or more control signals that cause a packet descriptor corresponding to the packet to bypass a plurality of second lookup engines that perform the plurality of second lookups in response to determining there is the match of the first lookup key in the first database.

Embodiment 16: The method for processing the packet of embodiment 12, further comprising: controlling the packet processor so that the packet descriptor corresponding to the packet bypasses a plurality of second lookup engines that perform the plurality of second lookups in response to determining there is the match of the first lookup key in the first database.

Embodiment 17: The method for processing the packet of any of embodiments 12-16, wherein: performing the first lookup in the first database and determining whether there is the match of the first lookup key in the first database is complete prior to starting any of the second lookups in the second databases.

Embodiment 18: The method for processing the packet of any of embodiments 12-17, wherein: determining, in response to determining there is the match of the first lookup key in the first database, the plurality of processing actions to be performed by the network device in connection with the packet comprises retrieving from the first database at least i) an identifier of a flow to which the packet belongs, and ii) one or more identifiers of one or more network interfaces, among the plurality of network interfaces, via which the packet is to be transmitted; and performing, in response to determining there is no match of the first lookup key in the first database, the plurality of second lookups in the plurality of second databases comprises: performing a lookup one of the second databases to determine the identifier of the flow to which the packet belongs, and performing a lookup another one of the second databases to determine the one or more identifiers of one or more network interfaces, among the plurality of network interfaces, via which the packet is to be transmitted.

Embodiment 19: The method for processing the packet of any of embodiments 12-18, wherein: determining, in response to determining there is the match of the first lookup key in the first database, the plurality of processing actions to be performed by the network device in connection with the packet comprises retrieving from the first database at least i) an indication of whether a tunnel header is to be added to the packet, and ii) one or more identifiers of one or more network interfaces, among the plurality of network interfaces, via which the packet is to be transmitted; and performing, in response to determining there is no match of the first lookup key in the first database, the plurality of second lookups in the plurality of second databases comprises: performing a lookup in one of the second databases to determine whether the tunnel header is to be added to the packet, and performing a lookup in another one of the second databases to determine the one or more identifiers of one or more network interfaces, among the plurality of network interfaces, via which the packet is to be transmitted.

Embodiment 20: The method for processing the packet of any of embodiments 12-19, comprising, in response to determining there is no match of the first lookup key in the first database: generating, at the packet processor, a new lookup pattern corresponding to the packet; determining, by the packet processor, a plurality of processing actions that were performed by the network device in connection with the packet; and storing in the first database a new entry that includes i) the new lookup pattern, and ii) one or more indications of the plurality of processing actions that were performed by the network device in connection with the packet.

Embodiment 21: The method for processing the packet of embodiment 20, wherein generating the new lookup pattern corresponding to the packet comprises: generating the new lookup pattern using the plurality of second lookup keys used to perform the second lookups in the second databases.

Embodiment 22: The method for processing the packet of embodiment 21, wherein generating the new lookup pattern corresponding to the packet comprises: generating the new lookup pattern to include all of the information included in the plurality of second lookup keys.

It is noted that each of the blocks of the figures may be implemented using hardware, a processor executing machine-readable instructions, or any combination thereof. When a block is implemented at least partially using a processor that executes machine-readable instructions, the instructions may be stored in any suitable computer readable memory such as a RAM, a read only memory (ROM), a solid state memory.

When implemented in hardware, the hardware may comprise one or more of discrete components, an integrated circuit, an application-specific integrated circuit (ASIC), a programmable logic device, a field programmable gate array, etc. Referring to FIG. 1, in accordance with an embodiment, the pipeline 124 is implemented on a single integrated circuit (IC). In other embodiments, the pipeline 124 is implemented on a plurality of ICs. For example, in one embodiment, the ingress portion 128 is implemented on a first IC and the egress portion 132 is implemented on a second IC, according to an embodiment.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device for processing packets, the network device comprising:
 a plurality of network interfaces; and
 a packet processor coupled to the plurality of network interfaces, the packet processor configured to process packet headers of packets received via the plurality of network interfaces to determine network interfaces via which the packets are to be transmitted, the packet processor comprising:
  a header parser engine configured to, for each of at least some of the packets, parse a header portion of the packet to identify header fields in the packet that are defined by one or more network communication protocols,
  a first lookup engine coupled to a first database, the first lookup engine configured to, for each of at least some of the packets: i) generate a first lookup key using a plurality of header fields identified by the header parser engine, ii) perform a first lookup in the first database for the packet using the first lookup key, and iii) in response to finding a match of the first lookup key in the first database, determine a plurality of processing actions to be performed by the packet processor in connection with the packet,
  a plurality of second lookup engines, each second lookup engine configured to, for each of at least some of the packets: i) selectively perform a respective second lookup in a respective second database for the packet using a respective second lookup key that includes a respective set of one or more header fields identified by the header parser engine, and ii) selectively determine, based on the second lookup, one or more processing actions to be performed by the packet processor in connection with the packet, and
  a controller configured to cause the plurality of second lookup engines to skip performing the second lookups for the packet in response to the first lookup engine finding the match of the first lookup key in the first database.

2. The network device of claim 1, wherein:
 the controller is configured to, for each of at least some of the packets, modify a packet descriptor corresponding to the packet to include an indication of whether the first lookup engine found the match of the first lookup key in the first database; and
 each second lookup engine is configured to, for each of at least some of the packets, analyze the indication in the packet descriptor to determine whether to perform the respective second lookup in the respective second database for the packet.

3. The network device of claim 1, wherein:
 the controller is configured to, for each of at least some of the packets, generate one or more control signals that indicate whether the whether the first lookup engine found the match of the first lookup key in the first database; and
 each second lookup engine is configured to, for each of at least some of the packets, determine whether to perform the respective second lookup in the respective second database for the packet based on a respective one of the one or more control signals.

4. The network device of claim 1, wherein the controller is configured to, for each of at least some of the packets:
generate one or more control signals configured to cause a packet descriptor corresponding to the packet to bypass the plurality of second lookup engines when the first lookup engine finds the match of the first lookup key in the first database.

5. The network device of claim 1, wherein:
the packet processor comprises a pipeline having a plurality of pipeline element arranged sequentially in an order, the pipeline including the first lookup engine and the plurality of second lookup engines; and
the first lookup engine is located within the pipeline prior to the plurality of second lookup engines according to the order so that, for each at least some of the packets, the first lookup engine determines whether the first database includes the match of the first lookup key prior to the plurality of second lookup engines starting the second lookups.

6. The network device of claim 1, wherein:
the first lookup engine is configured to, in response to finding the match of the first lookup key in the first database, retrieve from the first database at least i) an identifier of a flow to which the packet belongs, and ii) one or more identifiers of one or more network interfaces, among the plurality of network interfaces, via which the packet is to be transmitted; and
the plurality of second lookup engines includes:
a policy engine that is configured to use the respective second lookup key to perform a lookup in the respective second database to determine the identifier of the flow to which the packet belongs, and
a forwarding engine that is configured to use the respective second lookup key to perform a lookup in the respective second database to determine the one or more identifiers of one or more network interfaces, among the plurality of network interfaces, via which the packet is to be transmitted.

7. The network device of claim 1, wherein:
the first lookup engine is configured to, in response to finding the match of the first lookup key in the first database, retrieve from the first database at least i) an indication of whether a tunnel header is to be added to the packet, and ii) one or more identifiers of one or more network interfaces, among the plurality of network interfaces, via which the packet is to be transmitted; and
the plurality of second lookup engines includes:
a tunnel engine that is configured to use the respective second lookup key to perform a lookup in the respective second database to determine whether the tunnel header is to be added to the packet, and
a forwarding engine that is configured to use the respective second lookup key to perform a lookup in the respective second database to determine the one or more identifiers of one or more network interfaces, among the plurality of network interfaces, via which the packet is to be transmitted.

8. The network device of claim 1, wherein the packet processor further comprises:
a database update engine configure to, in response to the first lookup engine determining that a match of the first lookup key is not found in the first database:
generate a new lookup pattern corresponding to the packet,
determine a plurality of processing actions that were performed by the packet processor for the packet, and
store in the first database a new entry that includes i) the new lookup pattern, and ii) one or more indications of the plurality of processing actions that were performed by the packet processor in connection with the packet.

9. The network device of claim 8, wherein the database update engine is configured to, in response to the first lookup engine determining that the match of the first lookup key is not found in the first database:
generate the new lookup pattern using the plurality of second lookup keys used by the plurality of second lookup engines to perform the second lookups in the second databases.

10. The network device of claim 9, wherein the database update engine is configured to, in response to the first lookup engine determining that the match of the first lookup key is not found in the first database:
generate the new lookup pattern to include all of the information included in the plurality of second lookup keys.

11. A method for processing a packet in a network device, the method comprising:
receiving a packet via a network interface among a plurality of network interfaces of the network device;
parsing, at a packet processor of the network device, a header portion of the packet to identify header fields in the packet that are defined by one or more network communication protocols;
generating, at the packet processor, a first lookup key for the packet using a plurality of header fields identified by the parsing of the header portion of the packet;
performing, at the packet processor, a first lookup in a first database using the first lookup key;
in response to determining there is a match of the first lookup key in the first database, determining, by the packet processor, a plurality of processing actions to be performed by the network device in connection with the packet based on information in the first database corresponding to the match of the first lookup key in the first database;
in response to determining that there is no match of the first lookup key in the first database:
performing, at the packet processor, a plurality of second lookups in a plurality of second databases using a plurality of second lookup keys, the plurality of second lookup keys having been generated using one or more header fields identified by the parsing of the header portion of the packet, and
determining, at the packet processor, the plurality of processing actions to be performed by the network device in connection with the packet based on information in the second databases corresponding to matches of the second lookup keys in the second databases;
in response to determining that there is the match of the first lookup key in the first database, skipping performing the plurality of second lookups for the packet; and
performing, by the network device, the plurality of processing actions for the packet.

12. The method for processing the packet of claim 11, further comprising:

modifying, by the packet processor, a packet descriptor corresponding to the packet to include an indication of whether there is the match of the first lookup key in the first database; and in connection with each second lookup, analyzing, by the packet processor, the indication in the packet descriptor to determine whether to perform the second lookup in the second database for the packet.

13. The method for processing the packet of claim 11, further comprising:

generating, by the packet processor, one or more control signals that indicate whether there is the match of the first lookup key in the first database; and in connection with each second lookup, determining, at the packet processor, whether to perform the second lookup in the second database for the packet based on a respective one of the one or more control signals.

14. The method for processing the packet of claim 11, further comprising:

generating, at the packet processor, one or more control signals that cause a packet descriptor corresponding to the packet to bypass a plurality of second lookup engines that perform the plurality of second lookups in response to determining there is the match of the first lookup key in the first database.

15. The method for processing the packet of claim 11, wherein:

performing the first lookup in the first database and determining whether there is the match of the first lookup key in the first database is complete prior to starting any of the second lookups in the second databases.

16. The method for processing the packet of claim 11, wherein:

determining, in response to determining there is the match of the first lookup key in the first database, the plurality of processing actions to be performed by the network device in connection with the packet comprises retrieving from the first database at least i) an identifier of a flow to which the packet belongs, and ii) one or more identifiers of one or more network interfaces, among the plurality of network interfaces, via which the packet is to be transmitted; and performing, in response to determining there is no match of the first lookup key in the first database, the plurality of second lookups in the plurality of second databases comprises:

performing a lookup one of the second databases to determine the identifier of the flow to which the packet belongs, and performing a lookup another one of the second databases to determine the one or more identifiers of one or more network interfaces, among the plurality of network interfaces, via which the packet is to be transmitted.

17. The method for processing the packet of claim 11, wherein:

determining, in response to determining there is the match of the first lookup key in the first database, the plurality of processing actions to be performed by the network device in connection with the packet comprises retrieving from the first database at least i) an indication of whether a tunnel header is to be added to the packet, and ii) one or more identifiers of one or more network interfaces, among the plurality of network interfaces, via which the packet is to be transmitted; and performing, in response to determining there is no match of the first lookup key in the first database, the plurality of second lookups in the plurality of second databases comprises:

performing a lookup in one of the second databases to determine whether the tunnel header is to be added to the packet, and performing a lookup in another one of the second databases to determine the one or more identifiers of one or more network interfaces, among the plurality of network interfaces, via which the packet is to be transmitted.

18. The method for processing the packet of claim 11, comprising, in response to determining there is no match of the first lookup key in the first database:

generating, at the packet processor, a new lookup pattern corresponding to the packet;

determining, by the packet processor, a plurality of processing actions that were performed by the network device in connection with the packet; and storing in the first database a new entry that includes i) the new lookup pattern, and ii) one or more indications of the plurality of processing actions that were performed by the network device in connection with the packet.

19. The method for processing the packet of claim 18, wherein generating the new lookup pattern corresponding to the packet comprises:

generating the new lookup pattern using the plurality of second lookup keys used to perform the second lookups in the second databases.

20. The method for processing the packet of claim 19, wherein generating the new lookup pattern corresponding to the packet comprises:

generating the new lookup pattern to include all of the information included in the plurality of second lookup keys.

* * * * *